US012183262B2

(12) United States Patent
Yin

(10) Patent No.: US 12,183,262 B2
(45) Date of Patent: Dec. 31, 2024

(54) PIXEL COMPENSATION CIRCUIT, DISPLAY PANEL, AND PIXEL COMPENSATION METHOD

(71) Applicant: Shenzhen China Star Optoelectronics Semiconductor Display Technology Co., Ltd., Guangdong (CN)

(72) Inventor: Xiang Yin, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/779,599

(22) PCT Filed: May 18, 2022

(86) PCT No.: PCT/CN2022/093578

§ 371 (c)(1),
(2) Date: May 25, 2022

(87) PCT Pub. No.: WO2023/201817

PCT Pub. Date: Oct. 26, 2023

(65) Prior Publication Data

US 2024/0194122 A1 Jun. 13, 2024

(30) Foreign Application Priority Data

Apr. 18, 2022 (CN) ......................... 202210406695.8

(51) Int. Cl.
*G09G 3/32* (2016.01)

(52) U.S. Cl.
CPC ....... *G09G 3/32* (2013.01); *G09G 2320/0233* (2013.01); *G09G 2320/0242* (2013.01); *G09G 2320/0626* (2013.01)

(58) Field of Classification Search
CPC ............. G09G 3/32; G09G 2320/0233; G09G 2320/0242; G09G 2320/0626
See application file for complete search history.

(56) References Cited

U.S. PATENT DOCUMENTS

2007/0126680 A1 6/2007 Han et al.
2015/0187270 A1 7/2015 Lee et al.
(Continued)

FOREIGN PATENT DOCUMENTS

CN 103050080 4/2013
CN 103123773 5/2013
(Continued)

OTHER PUBLICATIONS

International Search Report and the Written Opinion Dated Nov. 25, 2022 From the International Searching Authority Re. Application No. PCT/CN2022/093578 and Its Translation Into English. (20 Pages).

(Continued)

*Primary Examiner* — Kenneth B Lee, Jr.

(57) ABSTRACT

The present disclosure provides a pixel compensation circuit, a display panel, and a pixel compensation method. The pixel compensation circuit includes a first transistor, a driving transistor, a compensation transistor, a second transistor, a third transistor, a reset transistor, a storage capacitor, and a light-emitting device. The circuit of the present disclosure uses transistors having different types and complementary polarity, and the transistors are connected to a first scanning line and a second scanning line, respectively. Compared with a conventional pixel compensation circuit, the circuit of the present disclosure uses fewer scanning signal lines and simpler timing.

16 Claims, 2 Drawing Sheets

(56) References Cited

U.S. PATENT DOCUMENTS

| | | | | |
|---|---|---|---|---|
| 2016/0189606 | A1* | 6/2016 | Chen | G09G 3/3233 345/78 |
| 2019/0019452 | A1 | 1/2019 | Zhu et al. | |
| 2019/0066598 | A1 | 2/2019 | Kim et al. | |
| 2022/0301496 | A1* | 9/2022 | Park | G09G 3/32 |

FOREIGN PATENT DOCUMENTS

| | | |
|---|---|---|
| CN | 104465715 | 3/2015 |
| CN | 104867442 | 8/2015 |
| CN | 106128360 | 11/2016 |
| CN | 106504703 | 3/2017 |
| CN | 107230452 | 10/2017 |
| CN | 107516488 | 12/2017 |
| CN | 107945743 | 4/2018 |
| CN | 110176213 | 8/2019 |
| CN | 112489599 | 3/2021 |

OTHER PUBLICATIONS

Notification of Office Action and Search Report Dated Nov. 28, 2022 From the State Intellectual Property Office of the People's Republic of China Re. Application No. 202210406695.8 and Its Translation Into English. (27 Pages).

* cited by examiner

PIXEL COMPENSATION CIRCUIT, DISPLAY PANEL, AND PIXEL COMPENSATION METHOD

RELATED APPLICATIONS

This application is a National Phase of PCT Patent Application No. PCT/CN2022/093578 having International filing date of May 18, 2022, which claims the benefit of priority of Chinese Patent Application No. 202210406695.8 filed on Apr. 18, 2022. The contents of the above applications are all incorporated by reference as if fully set forth herein in their entirety.

FIELD AND BACKGROUND OF THE INVENTION

The present disclosure relates to a field of display technology, and in particular, to a pixel compensation circuit, a display panel, and a pixel compensation method.

Conventional liquid crystal displays (LCD) are voltage-driven devices. While organic light-emitting diodes (OLED), mini semiconductor light-emitting diodes (Mini-LED), and micro semiconductor light-emitting diodes (Micro-LED) are current-driven devices, which are sensitive to the electrical variation of field effect thin film transistors (TFT). The uniformity of threshold voltages (Vth) of driving transistors of a display panel and the drift of the Vth at a forward biasing force (Stress) affect the accuracy and uniformity of a picture display. To solve the problem of Vth offset, a compensation circuit design is introduced.

An external compensation is applied to a large size panel, but the cost on the external compensation is relatively high. An internal compensation circuit is generally applied to a low temperature poly-silicon (LTPS) thin film transistor of a small and medium size liquid crystal display panel. For example, a 7T1C internal compensation circuit, and a 6T1C internal compensation circuit at present are used by some manufactures, which can realize the internal compensation of the Vth. However, these internal compensation circuits have more scanning signals and complicated timing.

SUMMARY OF THE INVENTION

The present disclosure provides a pixel compensation circuit, a display panel, and a pixel compensation method. The circuit of the present disclosure uses transistors having different types and complementary polarity to compensate a threshold voltage in a driving transistor, so that a light emission luminance of a light-emitting device is more uniform. Compared with a conventional pixel compensation circuit, the circuit of the present disclosure uses fewer scanning signal lines.

According to an aspect, the present disclosure provides a pixel compensation circuit including a first transistor, a driving transistor, a compensation transistor, a second transistor, a third transistor, a reset transistor, a storage capacitor, and a light-emitting device;

wherein a gate of the first transistor is electrically connected to a second scanning line, a source of the first transistor is electrically connected to a data line, and a drain of the first transistor is electrically connected to a first node, wherein the second scanning line is configured to provide a second scanning signal, and the data line is configured to provide a data signal;

wherein a gate of the driving transistor is electrically connected to a third node, a source of the driving transistor is electrically connected to a second node, and a drain of the driving transistor is electrically connected to the first node;

wherein a gate of the compensation transistor is electrically connected to a first scanning line, a source of the compensation transistor is electrically connected to the second node, and a drain of the compensation transistor is electrically connected to the third node, wherein the first scanning line is configured to provide a first scanning signal;

wherein a gate of the second transistor is electrically connected to the second scanning line, a source of the second transistor is electrically connected to the second node, and a drain of the second transistor is electrically connected to a positive electrode of a power supply;

wherein a gate of the third transistor is electrically connected to the first scanning line, a source of the third transistor is electrically connected to the first node, and a drain of the third transistor is electrically connected to the light-emitting device at a fourth node, wherein another end of the light-emitting device is electrically connected to a negative electrode of the power supply;

wherein a gate of the reset transistor is electrically connected to the first scanning line at a fifth node, the storage capacitor is electrically connected between a source of the reset transistor and the third node, a source of the reset transistor is electrically connected to the fourth node through a wire, and a drain of the reset transistor is electrically connected to a reset signal line; and wherein the first transistor, the compensation transistor, and the reset transistor are unipolar transistors which have a type complementary to a type of the driving transistor, the second transistor, and the third transistor.

In possible embodiments of the present disclosure, the driving transistor, the second transistor, and the third transistor are N-channel thin film transistors.

In possible embodiments of the present disclosure, each of the N-channel thin film transistors comprises an N-channel amorphous silicon transistor, an N-channel low temperature poly-silicon transistor, or an N-channel metal-oxide-semiconductor field-effect transistor In possible embodiments of the present disclosure, the first transistor, the compensation transistor, and the reset transistor employ transistors are P-channel thin film transistors.

In possible embodiments of the present disclosure, each of the P-channel thin film transistors comprises a P-channel low temperature poly-silicon transistor, or a P-channel metal-oxide-semiconductor field-effect transistor.

In possible embodiments of the present disclosure, the first scanning line and the second scanning line are combined to correspond to a reset phase, a data writing phase, and a light-emitting phase sequentially.

In possible embodiments of the present disclosure, in the reset phase, the first scanning line is at a low level and the second scanning line is at a high level.

In possible embodiments of the present disclosure, in the reset phase, the compensation transistor, the second transistor, and the reset transistor are all in an on state; and the first transistor, the driving transistor, and the third transistor are all in an off state.

In possible embodiments of the present disclosure, in the data writing phase, both the first scanning line and the second scanning line are at a low level.

In possible embodiments of the present disclosure, in the data writing phase, the first transistor, the compensation transistor, and the reset transistor are all in an on state; and the driving transistor, the second transistor, and the third transistor are all in an off state.

In possible embodiments of the present disclosure, in the light-emitting phase, both the first scanning line and the second scanning line are at a high level.

In possible embodiments of the present disclosure, in the light-emitting phase, the second transistor and the third transistor are both in an on state; and the first transistor, the compensation transistor, and the reset transistor are all in an off state.

In possible embodiments of the present disclosure, the first transistor is configured as a control switching transistor to control a data signal to write into the pixel compensation circuit.

In possible embodiments of the present disclosure, the driving transistor is configured to drive the light-emitting device to emit a light.

In possible embodiments of the present disclosure, the compensation transistor is configured to compensate a threshold voltage in the driving transistor.

In possible embodiments of the present disclosure, the second transistor and the third transistor are configured as control switching transistors to control the light-emitting device to emit a light.

In possible embodiments of the present disclosure, the reset transistor is configured to control a reset of the pixel compensation circuit.

In possible embodiments of the present disclosure, the second scanning line and the first scanning line are parallel to each other and transmit signals independently.

In another aspect, the present disclosure provides a display panel including the pixel compensation circuit as described above.

According to another aspect, the present disclosure further provides a pixel compensation method comprising:

- providing the pixel compensation circuit as described above;
- providing a low level from the first scanning line, and providing a high level from the second scanning line, when entering a reset phase; wherein the compensation transistor, the second transistor, and the reset transistor all in an on state; the first transistor, the driving transistor, and the third transistor all in an off state; a positive power supply voltage is written to the second node and the third node; and a reset voltage is written to the fourth node;
- providing a low level from the first scanning line and the second scanning line, when entering a data writing phase; wherein the first transistor, the compensation transistor, and the reset transistor are all in an on state; the driving transistor, the second transistor, and the third transistor are all in an off state; a data signal is written to the first node, and a voltage of the third node changes to a first voltage V1; the first voltage V1 satisfies: V1=Data+Vth, wherein Data is a data signal input from a data line, and Vth is a threshold voltage of the driving transistor; and
- providing a high level from the first scanning line and the second scanning line, when entering a light-emitting phase; wherein the second transistor and the third transistor are both in an on state; the first transistor, the compensation transistor, and the reset transistor are all in an off state; the first voltage V1 of the third node is consumed; the first voltage V1 comprises the threshold voltage of the driving transistor, and the light-emitting device emits a light.

The present disclosure provides a pixel compensation circuit including a first transistor, a driving transistor, a compensation transistor, a second transistor, a third transistor, a reset transistor, a storage capacitor, and a light-emitting device. According to the present disclosure, the first transistor, the compensation transistor, and the reset transistor are unipolar transistors which have a type complementary to a type of the driving transistor, the second transistor, and the third transistor. Compared with the conventional pixel compensation circuit, the pixel compensation circuit of the present disclosure compensate the threshold voltage in the driving transistor (i.e., the driving transistor in the present disclosure) only by using the first scanning line, the second scanning line, and simple timing control, thereby improving the uniformity and accuracy of the light-emitting device.

BRIEF DESCRIPTION OF THE SEVERAL VIEWS OF THE DRAWINGS

In order to more clearly illustrate the technical solutions in the embodiments of the present disclosure, the accompanying drawings required in the description of the embodiments will be briefly described below. It is obvious that the accompanying drawings in the following description are merely some embodiments of the present invention, and other drawings may be obtained by those skilled in the art without creative efforts.

DESCRIPTION OF SPECIFIC EMBODIMENTS OF THE INVENTION

The technical solutions in the embodiments of the present disclosure will be clearly and completely described below in conjunction with the accompanying drawings in the embodiments of the present disclosure. It is clear that the described embodiments are only some but not all of the embodiments of the present invention. Based on the embodiments of the invention, all other embodiments obtained by those skilled in the art without creative efforts are within the scope of the invention.

In the description of the invention, it is to be understood that the terms "first" and "second" are merely for describing, instead of indicating or implying the relative importance, or indicating the number of the features implicitly. The features defining "first" and "second" include one or more explicitly or implicitly. In the description of the present invention, "a plurality of" means two or more than two, unless otherwise specifically defined.

In the present disclosure, the term "example" is used to denote "as an example, exemplary, or illustration". Any embodiment described in this disclosure as "example" is not necessarily to be construed as preferred or advantageous over other embodiments. The following description is presented to enable the skilled in the art to implement and use the present invention. In the following description, details are set forth for the purpose of explanation. It should be understood by those of the skill in the art that the present invention may be practiced without using these particular details. In other examples, the known structures and processes are not described in detail to avoid unnecessary details that obscure the description of the invention. Accordingly, the present invention is not intended to be limited to the illustrated embodiments, but is consistent with the broadest scope consistent with the principles and features disclosed herein.

Embodiments of the present disclosure provide a pixel compensation circuit, a display panel, and a pixel compensation method, which are described in detail below.

Figure 1:
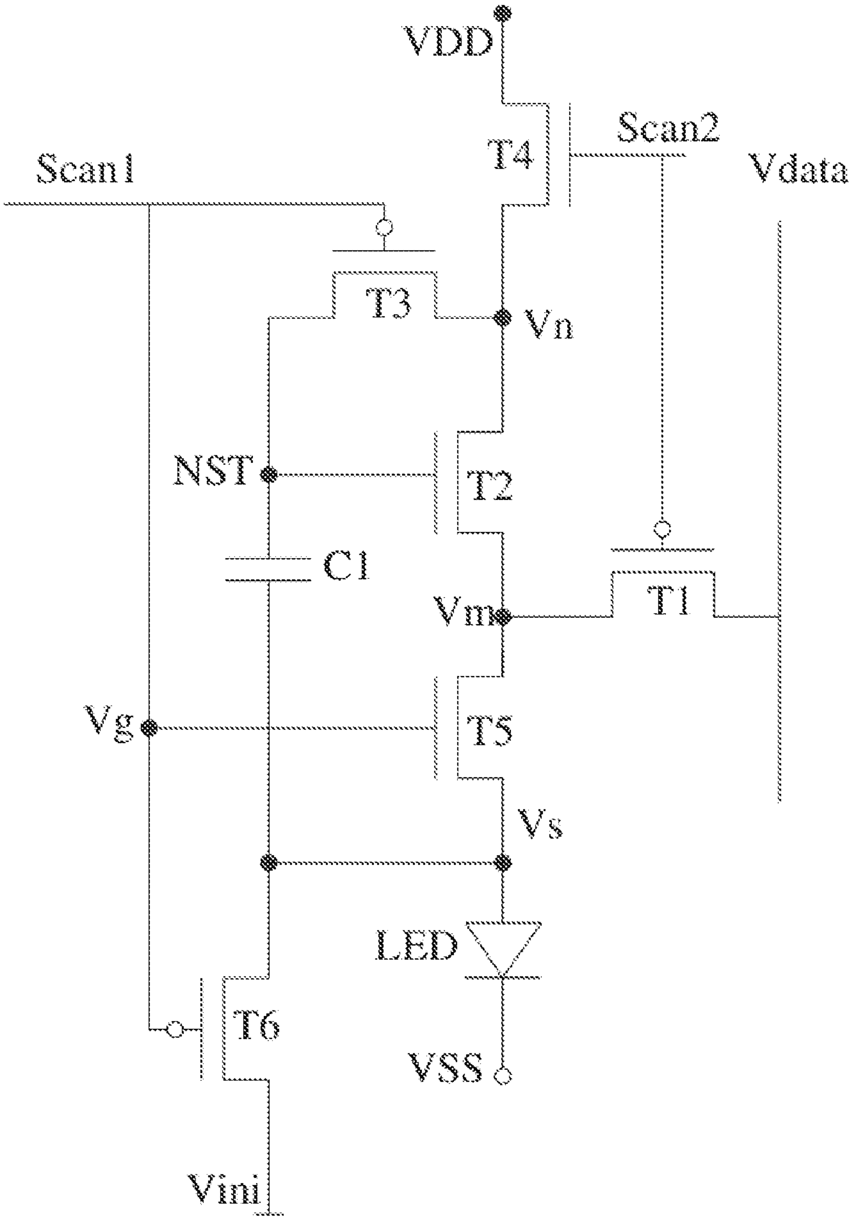
FIG. 1 is a circuit diagram of a pixel compensation circuit according to an embodiment of the present disclosure.

As shown in FIG. 1, a schematic structural diagram of an embodiment of a pixel compensation circuit according to an embodiment of the present disclosure. The pixel compensation circuit includes a first transistor T1, a driving transistor T2, a compensation transistor T3, a second transistor T4, a third transistor T5, a reset transistor T6, a capacitor C1, and a light-emitting device LED. The first transistor T1 is configured as a control switching transistor to control a data signal to write into the pixel compensation circuit. The driving transistor T2 is configured to drive the light-emitting device LED to emit a light. The compensation transistor T3 is configured to compensate a threshold voltage in the driving transistor T2. The second transistor T4 and the third transistor T5 are configured as control switching transistors to control the light-emitting device LED to emit the light. The reset transistor T6 is configured as a reset transistor to control a reset of the pixel compensation circuit. A gate of the first transistor T1 is electrically connected to a second scanning line Scan2, a source of the first transistor T1 is electrically connected to a data line Vdata, and a drain of the first transistor T1 is electrically connected to a first node Vm. The second scanning line Scan2 is configured to provide a second scanning signal, and the data line Vdata is configured to provide a data signal.

A gate of the driving transistor T2 is electrically connected to a third node NST, a source of the driving transistor T2 is electrically connected to a second node Vn, and a drain of the driving transistor T2 is electrically connected to the first node Vm.

A gate of the compensation transistor T3 is electrically connected to a first scanning line Scan1, a source of the compensation transistor T3 is electrically connected to the second node Vn, and a drain of the compensation transistor T3 is electrically connected to the third node NST. The first scanning line Scan1 is configured to provide a first scanning signal. In the pixel compensation circuit, the second scanning line Scan2 and the first scanning line Scan1 are parallel to each other and transmit signals independently.

A gate of the second transistor T4 is electrically connected to the second scanning line Scan2, a source of the second transistor T4 is electrically connected to the second node Vn, and a drain of the second transistor T4 is electrically connected to a positive electrode VDD of a power supply.

A gate of the third transistor T5 is electrically connected to the first scanning line Scan1, a source of the third transistor T5 is electrically connected to the first node Vm, and a drain of the third transistor T5 is electrically connected to the light-emitting device LED at a fourth node Vs. Another end of the light-emitting device LED is electrically connected to a negative electrode VSS of the power supply.

A gate of the reset transistor T6 is electrically connected to the first scanning line Scan1 at a fifth node Vg. The storage capacitor C1 is electrically connected between a source of the reset transistor T6 and the third node NST. The source of the reset transistor T6 is electrically connected to the fourth node Vs. A drain of the reset transistor T6 is electrically connected to a reset signal line Vini.

The first transistor T1, the compensation transistor T3, and the reset transistor T6 are unipolar transistors which have a type complementary to a type of the driving transistor T2, the second transistor T4, and the third transistor T5. Specifically, a 6T1C structure is applied to the pixel compensation circuit of this embodiment; wherein the driving transistor T2, the second transistor T4, and the third transistor T5 are N-channel thin film transistors (TFT). In this embodiment, the N-type TFTs include a plurality of N-type semiconductor devices. For example, the driving transistor T2, the second transistor T4, and the third transistor T5 may be N-channel amorphous silicon transistors (a-Si), N-channel low temperature poly-silicon transistors (N-LTP), N-channel metal-oxide-semiconductor field-effect transistors (MOSFET), and the like.

The first transistor T1, the compensation transistor T3, and the reset transistor T6 are P-channel thin film transistors (TFT). In this embodiment, the P-type TFTs include a plurality of P-type semiconductor devices. For example, the first transistor T1, the compensation transistor T3, and the reset transistor T6 may be P-channel low temperature poly-silicon transistors (P-LTPS), P-channel metal-oxide-semiconductor field-effect transistors, and the like.

The driving transistor T2 is configured to drive the light-emitting device LED in the pixel compensation circuit. The pixel compensation circuit provide in the present disclosure can compensate the threshold voltage of the driving transistor (i.e., the driving transistor T2). In the embodiment, the first scanning line Scan1, the second scanning line Scan2, and the reset signal line Vini are controlled by an external timing controller.

In the present disclosure, the first transistor T1, the compensation transistor T3, and the reset transistor T6 are unipolar transistors which have a type complementary to a type of the driving transistor T2, the second transistor T4, and the third transistor T5. Compared with the conventional pixel compensation circuit, the pixel compensation circuit with the above connection structure can realize a function of compensating the threshold voltage in the driving transistor (i.e., the driving transistor T2 in the present disclosure) only by using the first scanning line Scan1, the second scanning line Scan2, and a simple timing control, thereby improving the uniformity and the accuracy of the emission luminance of the light-emitting device LED.

Figure 2:
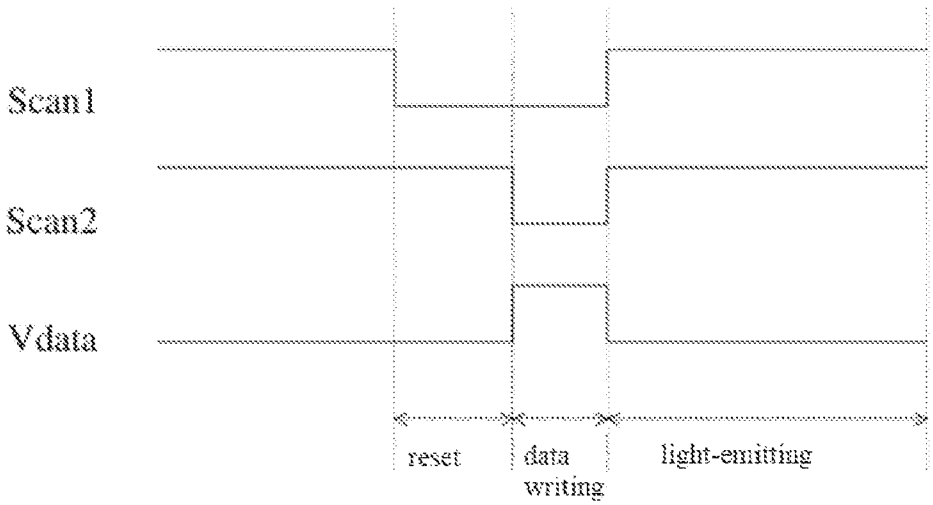
FIG. 2 is a timing diagram of a pixel compensation circuit according to an embodiment of the present disclosure.

In this embodiment, as shown in FIG. 2, the first scanning line Scan1 and the second scanning line Scan2 are combined to correspond to a reset phase, a data writing phase, and a light-emitting phase sequentially. The following describes the potential changes in the reset phase, the data writing phase, and the light-emitting phase, and how to achieve the compensation of the threshold voltage of the driving transistor.

In this embodiment, as shown in FIG. 2, in the reset stage, the first scanning line Scan1 is at a low level, and the second scanning line Scan2 is at a high level. The second transistor T4 is an N-type TFT, and the second scanning line Scan2 electrically connected to the gate of the second transistor T4 is at the high level. As such, the second transistor T4 is in an on state. The compensation transistor T3 and the reset transistor T6 are P-type TFTs complementary to the second transistor T4, and the first scanning line Scan1 electrically connected to the gate of the compensation transistor T3 and the gate of the reset transistor T6 is at the low level. As such, the compensation transistor T3 and the reset transistor T6 are also in the on state. That is, the compensation transistor T3, the second transistor T4 and the reset transistor T6 are in the on state.

Since the first transistor T1 is a P-type TFT and the second scanning line Scan2 electrically connected to the gate of the first transistor T1 is at the high level, the first transistor T1 is in an off state. Since the third transistor T5 is an N-type TFT and the first scanning line Scan1 electrically connected to the gate of the third transistor T5 is at the low level, the third transistor T5 is in the off state. Since the positive power supply voltage VDD is written to the second node Vn and the third node NST, this is, potentials of the gate and source of the driving transistor T2 are identical, the driving transistor T2 is also in the off state. That is, the first transistor T1, the driving transistor T2, and the third transistor T5 are all in the off state.

At this time, the positive power supply voltage VDD is written to the third node NST, the reset voltage Vini is written to the fourth node Vs, and the light-emitting device LED does not emit a light.

In this embodiment, in the data writing stage, the first scanning line Scan1 and the second scanning line Scan2 are both at the low level. The first transistor T1, the compensation transistor T3, and the reset transistor T6 are all P-type TFTs. The first scanning line Scan1 electrically connected to the gate of the first transistor T1, the gate of the compensation transistor T3, and the gate of the reset transistor T6 is at the low level. As such, the first transistor T1, the compensation transistor T3, and the reset transistor T6 are all in the on state.

The second transistor T4 and the third transistor T5 are both N-type TFTs. The second scanning line Scan2 electrically connected to the gate of the second transistor T4 and the first scanning line Scan1 electrically connected to the gate of the third transistor T5 are both at the low level. As such, the second transistor T4 and the third transistor T5 are both in the off state. The second transistor T4 is in the off state, an on condition of the driving transistor T2 cannot be satisfied, and therefore the driving transistor T2 is also in the off state. That is, the driving transistor T2, the second transistor T4, and the third transistor T5 are all in the off state.

At a moment switching to the data writing phase, this is, the moment at which the compensation transistor T3 is on and the second transistor T4 is off, the data signal Vdata is written to the first node Vm, and the positive power supply voltage VDD written to the third node NST in the reset phase starts to discharge until the gate and source voltage of the driving transistor T2 changes to the threshold voltage Vth of the driving transistor T2 and the driving transistor T2 turns off. At this time, the voltage of the third node NST changes to the sum of the drain voltage Vd (i.e., the data signal Vdata at the first node Vm) of the driving transistor T2 and the threshold voltage Vth of the driving transistor T2, this is, the voltage of the third node NST changes to the first voltage V1, and V1=Vdata+Vth. The voltage of the third node NST no longer changes after being reduced to this voltage V1. At this time, the voltage of the third node NST contains the threshold voltage Vth of the driving transistor T2. The light-emitting device LED does not emit a light, when the driving transistor T2 and the third transistor T5 are still in the off state.

In this embodiment, the first scanning line Scan1 and the second scanning line Scan2 are at the high level in the light-emitting stage. Both the second transistor T4 and the third transistor T5 are N-type TFTs, and the second scanning line Scan2 electrically connected to the gate of the second transistor T4 and the first scanning line Scan1 electrically connected to the gate of the third transistor T5 are at the high level. As such, both the second transistor T4 and the third transistor T5 are in the on state.

The first transistor T1, the compensation transistor T3, and the reset transistor T6 are all P-type TFTs, and the first scanning line Scan1 electrically connected to the gate of the first transistor T1, the gate of the compensation transistor T3, and the gate of the reset transistor T6 is at the high level. As such, the first transistor T1, the compensation transistor T3, and the reset transistor T6 are all in the off state.

Before the light-emitting phase, the voltage of the gate of the driving transistor T2 is the voltage of the third node NST, i.e., the first voltage V1, and V1=Vdata+Vth. The voltage of the fourth node Vs is the reset voltage. When the timing is switched to the light-emitting phase, the source and drain voltage T2_Vgs of the driving transistor T2 is the voltage difference between the third node NST and the fourth node Vs. Therefore, the source and drain voltage T2_Vgs of the driving transistor T2 at this time satisfies: T2_Vgs=Vdata+Vth−Vini, wherein Vdata is the data signal input from the data line Vdata, Vth is the threshold voltage of the driving transistor T2, and Vini is the reset voltage. The driving transistor T2 is turned on, and the first voltage V1 of the third node NST is consumed. Since the first voltage V1 includes the threshold voltage Vth of the driving transistor T2, the light-emitting device LED emits a light. The current Ioled flowing through the light-emitting device LED satisfies: Ioled=k*(Vdata−Vini)2, wherein k may be a parameter related to the size of each switching transistor or carrier mobility, etc., which is not specifically limited here. Therefore, the current flowing through the light-emitting device LED has no relationship with the threshold voltage of the driving transistor, thereby achieving compensation of the threshold voltage of the driving transistor.

According to another embodiment of the present disclosure, the present disclosure provides a display panel including, for example, a pixel compensation circuit described above.

According to another embodiment of the present disclosure, the present disclosure further provides a pixel compensation method, as shown in FIG. 1 and FIG. 2, the pixel compensation method includes S101-S104.

S101, a pixel compensation circuit as described above is provided.

The pixel compensation circuit includes a first transistor T1, a driving transistor T2, a compensation transistor T3, a second transistor T4, a third transistor T5, a reset transistor T6, a storage capacitor C1, and a light-emitting device LED.

S102, when entering the reset phase, the first scanning line Scan1 provides the low level, and the second scanning line Scan2 provides the high level. The compensation transistor T3, the second transistor T4, and the reset transistor T6 are all in the on state. The first transistor T1, the driving transistor T2, and the third transistor T5 are all in the off state. The positive power supply voltage is written to the second node Vn and the third node NST, and the reset voltage is written to the fourth node Vs.

S103, when entering the data writing stage, the first scanning line Scan1 and the second scanning line Scan2 provide the low level. The first transistor T1. The compensation transistor T3, and the reset transistor T6 are all in the on state. The driving transistor T2, the second transistor T4, and the third transistor T5 are all in the off state. The data signal is written to the first node Vm, and the voltage of the third node NST changes into the first voltage V1. The first voltage V1 satisfies: V1=Data+Vth, wherein Data is a data signal input from the data line Vdata, and Vth is a threshold voltage of the driving transistor T2.

S104, when entering the light-emitting phase, the first scanning line Scan1 and the second scanning line Scan2 both provides the high level. The second transistor T4 and the third transistor T5 are in the on state. The first transistor T1, the compensation transistor T3 and the reset transistor T6 are all in the off state. The first voltage V1 of the third node NST is consumed. The first voltage V1 includes the threshold voltage Vth of the driving transistor T2, and the light-emitting device LED emits a light. Therefore, the current flowing through the light-emitting device LED has no relationship with the threshold voltage of the driving transistor, thereby achieving compensation of the threshold voltage of the driving transistor.

A pixel compensation circuit, a display panel, and a pixel compensation method provided in the embodiments of this disclosure are described in detail above. The principles and implementation of the present invention are described herein by applying specific examples. The description of the above embodiments is only used to help understand the method and core idea of the present invention. At the same time, for those skilled in the art, according to the idea of the present invention, there will be some changes in the specific embodiment and disclosure scope. In conclusion, the contents of this specification shall not be construed as limiting the present invention.

What is claimed is:

1. A pixel compensation circuit, comprising a first transistor, a driving transistor, a compensation transistor, a second transistor, a third transistor, a reset transistor, a storage capacitor, and a light-emitting device;

wherein a gate of the first transistor is electrically connected to a second scanning line, a source of the first transistor is electrically connected to a data line, and a drain of the first transistor is electrically connected to a first node, wherein the second scanning line is configured to provide a second scanning signal, and the data line is configured to provide a data signal;

wherein a gate of the driving transistor is electrically connected to a third node, a source of the driving transistor is electrically connected to a second node, and a drain of the driving transistor is electrically connected to the first node;

wherein a gate of the compensation transistor is electrically connected to a first scanning line, a source of the compensation transistor is electrically connected to the second node, and a drain of the compensation transistor is electrically connected to the third node, wherein the first scanning line is configured to provide a first scanning signal;

wherein a gate of the second transistor is electrically connected to the second scanning line, a source of the second transistor is electrically connected to the second node, and a drain of the second transistor is electrically connected to a positive electrode of a power supply;

wherein a gate of the third transistor is electrically connected to the first scanning line, a source of the third transistor is electrically connected to the first node, and a drain of the third transistor is electrically connected to the light-emitting device at a fourth node, wherein another end of the light-emitting device is electrically connected to a negative electrode of the power supply;

wherein a gate of the reset transistor is electrically connected to the first scanning line at a fifth node, the storage capacitor is electrically connected between a source of the reset transistor and the third node, a source of the reset transistor is electrically connected to the fourth node through a wire, and a drain of the reset transistor is electrically connected to a reset signal line; and wherein the first transistor, the compensation transistor, and the reset transistor are unipolar transistors which have a type complementary to a type of the driving transistor, the second transistor, and the third transistor;

wherein the first scanning line and the second scanning line are combined to correspond to a reset phase, a data writing phase, and a light-emitting phase sequentially;

wherein in the reset phase, the first scanning line is at a low level and the second scanning line is at a high level; in the data writing phase, both the first scanning line and the second scanning line are at a low level; in the light-emitting phase, both the first scanning line and the second scanning line are at a high level.

2. The pixel compensation circuit of claim 1, wherein the driving transistor, the second transistor, and the third transistor are N-channel thin film transistors.

3. The pixel compensation circuit of claim 2, wherein each of the N-channel thin film transistors comprises an N-channel amorphous silicon transistor, an N-channel low temperature poly-silicon transistor, or an N-channel metal-oxide-semiconductor field-effect transistor.

4. The pixel compensation circuit of claim 1, wherein the first transistor, the compensation transistor, and the reset transistor are P-channel thin film transistors.

5. The pixel compensation circuit of claim 4, wherein each of the P-channel thin film transistors comprises a P-channel low temperature poly-silicon transistor, or a P-channel metal-oxide-semiconductor field-effect transistor.

6. The pixel compensation circuit of claim 1, wherein in the reset phase, the compensation transistor, the second transistor, and the reset transistor are all in an on state; and the first transistor, the driving transistor, and the third transistor are all in an off state.

7. The pixel compensation circuit of claim 1, wherein in the data writing phase, the first transistor, the compensation transistor, and the reset transistor are all in an on state; and the driving transistor, the second transistor, and the third transistor are all in an off state.

8. The pixel compensation circuit of claim 1, wherein in the light-emitting phase, the second transistor and the third transistor are both in an on state; and the first transistor, the compensation transistor, and the reset transistor are all in an off state.

9. The pixel compensation circuit of claim 1, wherein the first transistor is configured as a control switching transistor to control a data signal to write into the pixel compensation circuit.

10. The pixel compensation circuit of claim 1, wherein the driving transistor is configured to drive the light-emitting device to emit a light.

11. The pixel compensation circuit of claim 1, wherein the compensation transistor is configured to compensate a threshold voltage in the driving transistor.

12. The pixel compensation circuit of claim 1, wherein the second transistor and the third transistor are configured as control switching transistors to control the light-emitting device to emit a light.

13. The pixel compensation circuit of claim 1, wherein the reset transistor is configured to control a reset of the pixel compensation circuit.

14. The pixel compensation circuit of claim 1, wherein the second scanning line and the first scanning line are parallel to each other and transmit signals independently.

15. A display panel, wherein the display panel comprises the pixel compensation circuit of claim 1.

16. A pixel compensation method, wherein the pixel compensation method comprises:

providing the pixel compensation circuit of claim 1;

providing a low level from the first scanning line, and providing a high level from the second scanning line, when entering a reset phase; wherein the compensation transistor, the second transistor, and the reset transistor all in an on state; the first transistor, the driving transistor, and the third transistor all in an off state; a positive power supply voltage is written to the second node and the third node; and a reset voltage is written to the fourth node;

providing a low level from the first scanning line and the second scanning line, when entering a data writing phase; wherein the first transistor, the compensation transistor, and the reset transistor are all in an on state; the driving transistor, the second transistor, and the third transistor are all in an off state; a data signal is written to the first node, and a voltage of the third node changes to a first voltage V1; the first voltage V1 satisfies: V1=Data+Vth, wherein Data is a data signal input from a data line, and Vth is a threshold voltage of the driving transistor; and providing a high level from the first scanning line and the second scanning line, when entering a light-emitting phase; wherein the second transistor and the third transistor are both in an on state; the first transistor, the compensation transistor, and the reset transistor are all in an off state; the first voltage V1 of the third node is consumed; the first voltage V1 comprises the threshold voltage of the driving transistor, and the light-emitting device emits a light.

* * * * *